US011492159B2

(12) United States Patent
Testoni et al.

(10) Patent No.: US 11,492,159 B2
(45) Date of Patent: *Nov. 8, 2022

(54) SYSTEM FOR TRANSFERRING A GROUP OF COMPONENTS OF ELECTRONIC CIGARETTES FROM A FIRST OPERATING STATION TO A SECOND OPERATING STATION

(71) Applicant: G.D S.p.A., Bologna (IT)

(72) Inventors: Luca Testoni, Castel Maggiore (IT); Luca Lanzarini, Crespellano (IT); Francesco Renco, Castel Maggiore (IT); Luca Mariani, Cesena (IT); Mirco Legnani, Casalecchio di Reno (IT); Massimo Sartoni, Bologna (IT); Luca Federici, Bologna (IT)

(73) Assignee: G.D S.P.A., Bologna (IT)

( * ) Notice: Subject to any disclaimer, the term of this patent is extended or adjusted under 35 U.S.C. 154(b) by 260 days.

This patent is subject to a terminal disclaimer.

(21) Appl. No.: 16/617,150

(22) PCT Filed: Jun. 1, 2018

(86) PCT No.: PCT/IB2018/053930
§ 371 (c)(1),
(2) Date: Nov. 26, 2019

(87) PCT Pub. No.: WO2018/220591
PCT Pub. Date: Dec. 6, 2018

(65) Prior Publication Data
US 2020/0198816 A1    Jun. 25, 2020

(30) Foreign Application Priority Data
Jun. 1, 2017    (IT) .................. 102017000060031

(51) Int. Cl.
*B65B 19/12*    (2006.01)
*B65B 5/06*    (2006.01)
(Continued)

(52) U.S. Cl.
CPC .............. *B65B 19/34* (2013.01); *A24F 40/70* (2020.01); *B65B 5/068* (2013.01); *B65B 5/106* (2013.01);
(Continued)

(58) Field of Classification Search
CPC ......... B65B 19/34; B65B 5/068; B65B 5/106; B65B 19/12; B65B 35/405; A24F 40/70; B65G 47/082
(Continued)

(56) References Cited

U.S. PATENT DOCUMENTS 3,365,857 A * 1/1968 Liedtke .................. A24C 5/354
53/148
3,481,447 A * 12/1969 David .................... A24C 5/354
198/429
(Continued)

FOREIGN PATENT DOCUMENTS

EP    0594917 A1    5/1994
GB    1056841 A    2/1967

OTHER PUBLICATIONS

International Search Report and Written Opinion dated Jul. 31, 2018 for counterpart International Patent Application No. PCT/IB2018/053930.

*Primary Examiner* — Robert F Long
*Assistant Examiner* — Xavier A Madison
(74) *Attorney, Agent, or Firm* — Shuttleworth & Ingersoll, PLC; Timothy J. Klima

(57) ABSTRACT

A system for transferring a group of components of electronic cigarettes from a first to a second operating station
(Continued)

includes a conveyor extends from a feeding zone to a disengagement zone and has a plurality of seats. A feeding device receives the components and feeds them into the seats at a first mutual distance. A disengaging and transferring device operates to disengage the components from their seats and transfer the components to a collecting zone. A compacting device operates in the collecting zone to move the components closer together and place them at a second mutual distance that is smaller than the first mutual distance. A tray faces and receives from the collecting zone the group of components which have been placed close together. A pushing device pushes the components from the collecting zone into the tray. A movement device transfers the tray to the second operating station.

12 Claims, 17 Drawing Sheets

(51) Int. Cl.
    *B65B 5/10*      (2006.01)
    *B65B 35/40*      (2006.01)
    *A24F 40/70*      (2020.01)
    *B65G 47/08*      (2006.01)
    *B65B 19/34*      (2006.01)
    *A24F 40/42*      (2020.01)

(52) U.S. Cl.
    CPC ............ *B65B 19/12* (2013.01); *B65B 35/405* (2013.01); *B65G 47/082* (2013.01); *A24F 40/42* (2020.01); *B65G 2201/0226* (2013.01)

(58) Field of Classification Search
    USPC .......................................................... 53/148
    See application file for complete search history.

(56) References Cited

U.S. PATENT DOCUMENTS

| | | | | |
|---|---|---|---|---|
| 3,599,396 | A * | 8/1971 | Schmermund | A24C 5/354 414/792.5 |
| 4,008,555 | A * | 2/1977 | Ainoya | B65B 19/04 53/236 |
| 4,181,212 | A * | 1/1980 | Hinchcliffe | A24C 5/352 198/429 |
| 4,364,464 | A * | 12/1982 | Manservisi | B65B 19/105 53/151 |
| 4,633,652 | A * | 1/1987 | Dagenais | B65B 19/34 53/148 |
| 4,827,691 | A * | 5/1989 | Hanada | B65B 19/04 53/151 |
| 5,524,416 | A * | 6/1996 | Linner | B65B 43/46 414/416.03 |
| 5,548,941 | A * | 8/1996 | Portaro | B65B 19/04 198/418.1 |
| 5,704,195 | A * | 1/1998 | Benz | B65G 47/26 53/448 |
| 7,308,779 | B2 * | 12/2007 | Benz | B65B 5/08 414/416.09 |
| 7,581,634 | B2 * | 9/2009 | Hart | B65G 47/52 198/429 |
| 9,624,042 | B2 * | 4/2017 | Benz | B65G 47/34 |
| 10,611,584 | B2 * | 4/2020 | Alig | B65G 65/00 |

\* cited by examiner

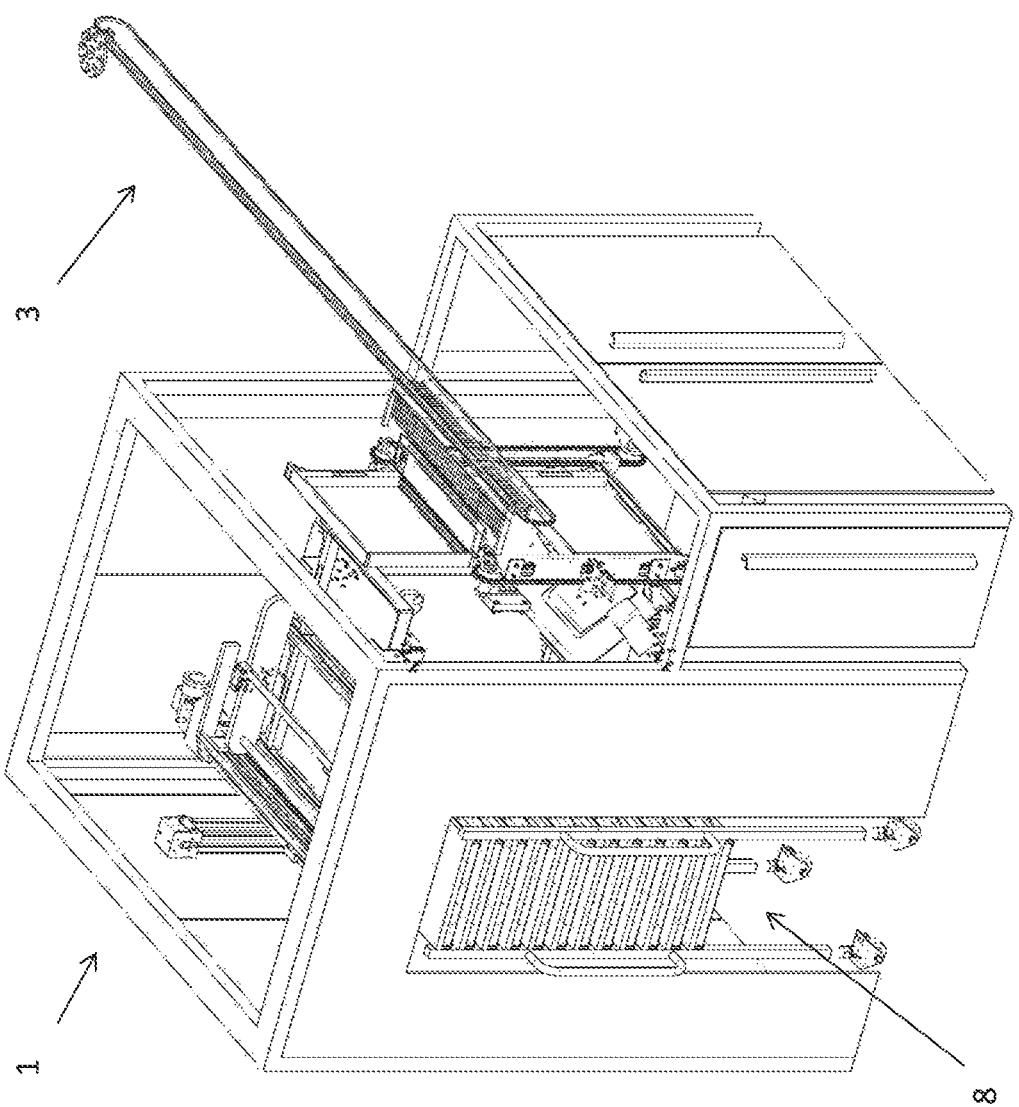

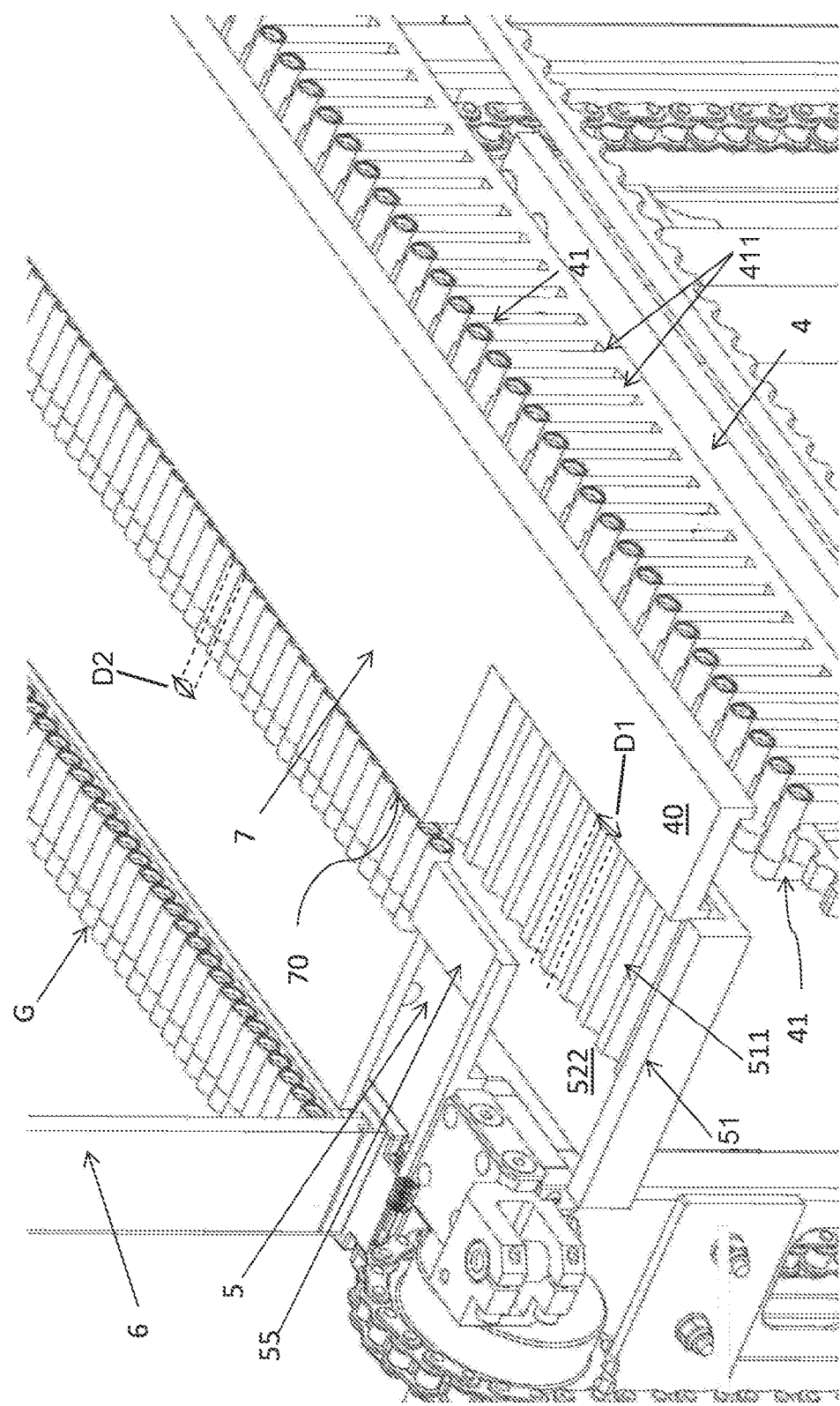

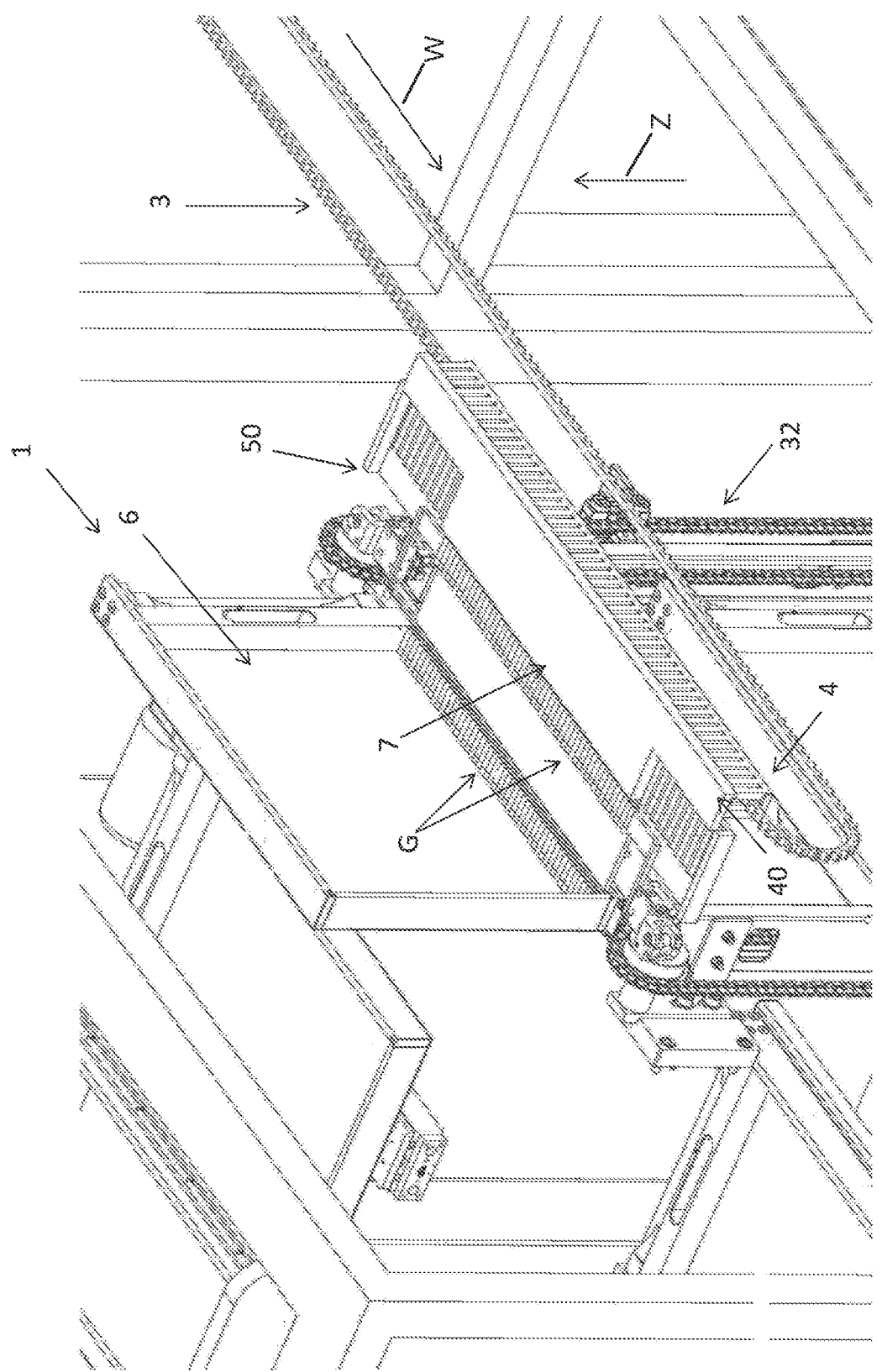

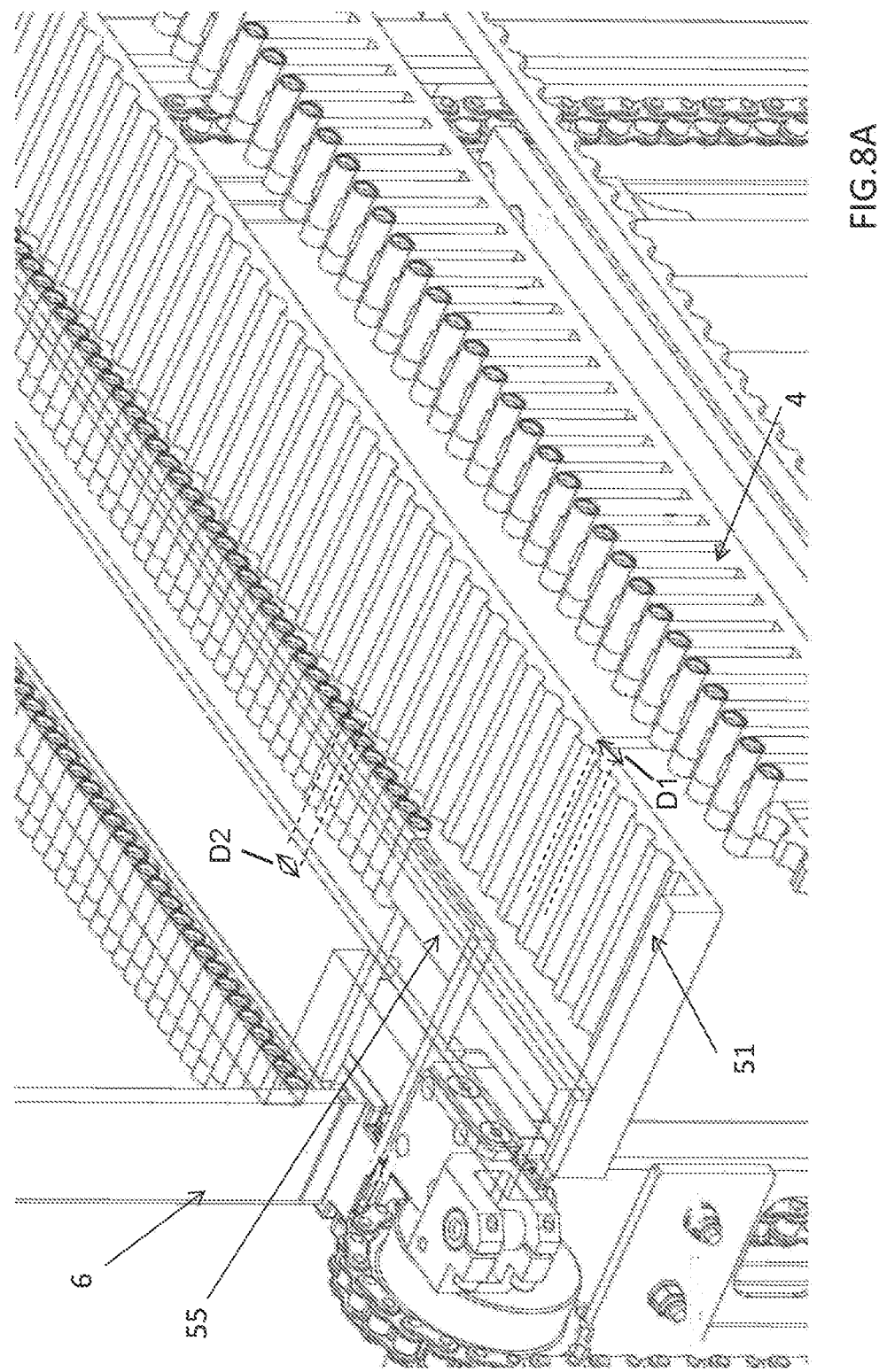

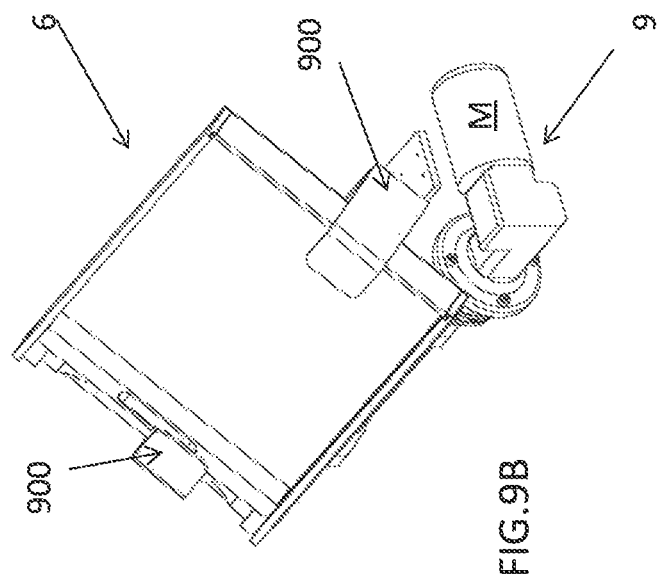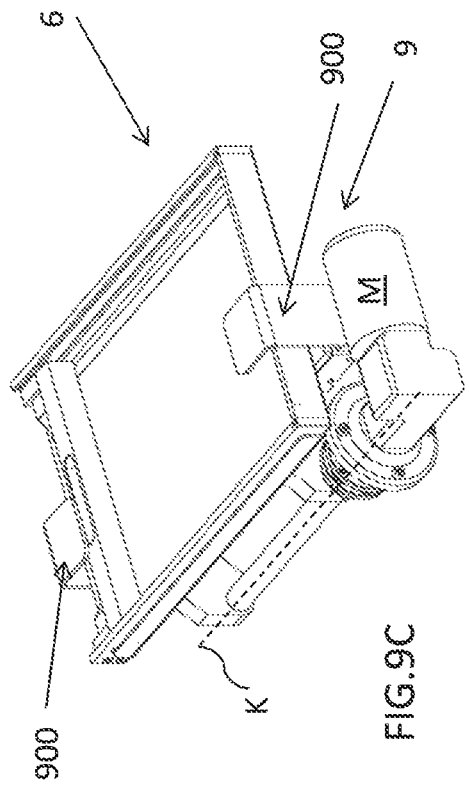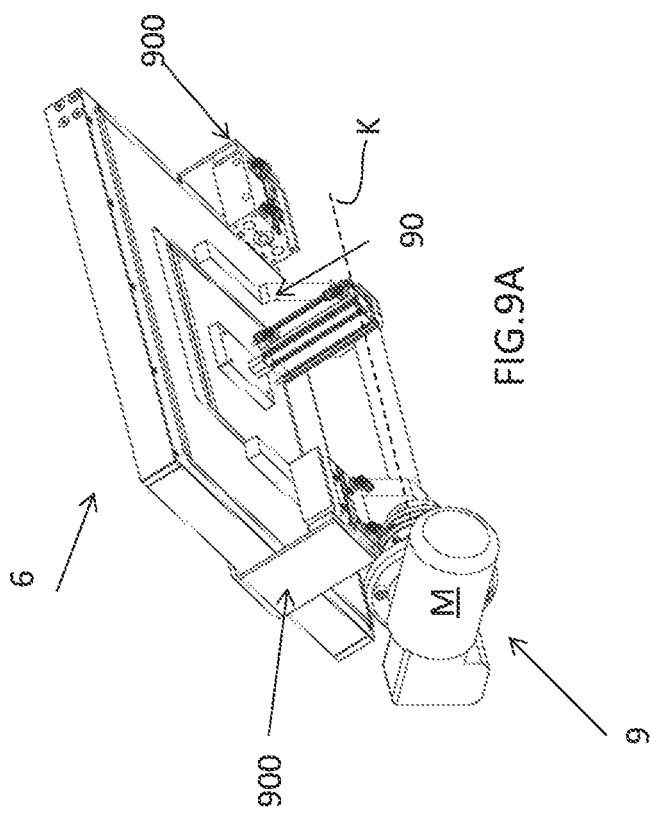

SYSTEM FOR TRANSFERRING A GROUP OF COMPONENTS OF ELECTRONIC CIGARETTES FROM A FIRST OPERATING STATION TO A SECOND OPERATING STATION

This application is the National Phase of International Application PCT/IB2018/053930 filed Jun. 1, 2018 which designated the U.S.

This application claims priority to Italian Patent Application No. 102017000060031 filed Jun. 1, 2017, which application is incorporated by reference herein.

TECHNICAL FIELD

This invention addresses the technical field of electronic cigarettes. More specifically, the invention relates to a system for transferring a group of components of electronic cigarettes from a first operating station to a second operating station.

BACKGROUND ART

As is known, electronic cigarettes are made up of different components which are assembled to each other.

Recently, the production of electronic cigarettes is becoming more and more automated; in particular, automatic stations are dedicated to operations which differ greatly from each other: for example, assembling the electronic components, filling the cartridges with the liquid to be vaporized, inspecting the assembled groups, etc.

Thus, the operating stations are often located in different rooms, that is to say, they are not usually in line. This gives rise to the need to transfer the groups of components from one operating station to another.

Unlike traditional cigarettes, the components of electronic cigarettes are not easy to transfer, not only on account of their shape but also because of the material they are made of, which in some of the components, is characterized by a low friction coefficient.

DISCLOSURE OF THE INVENTION

This invention has for an aim to overcome the drawbacks described above.

This aim is achieved by proposing a system for transferring a group of components of electronic cigarettes from a first operating station to a second operating station according to the accompanying claims.

Advantageously, the proposed system overcomes the above mentioned disadvantages of the prior art by guaranteeing controlled transfer of the electronic cigarette components of any shape and/or material.

BRIEF DESCRIPTION OF THE DRAWINGS

Further aims are more apparent in the specification which follows, with reference to the accompanying drawings, in which:

FIG. 1 shows a perspective view of a system for transferring a group of components of electronic cigarettes from a first operating station to a second operating station according to this invention;

FIGS. 4 and 4A are two enlarged details from FIG. 3 and FIG. 3A, respectively;

FIG. 5 is a view like that of FIG. 3 but with the system in a second operating situation;

FIG. 8A is a view like that of FIG. 8 but with some parts cut away in order to better illustrate others;

FIGS. 9A-9C are perspective views of a detail of the invention in three different operating situations;

DETAILED DESCRIPTION OF PREFERRED EMBODIMENTS OF THE INVENTION

Figure 1A:
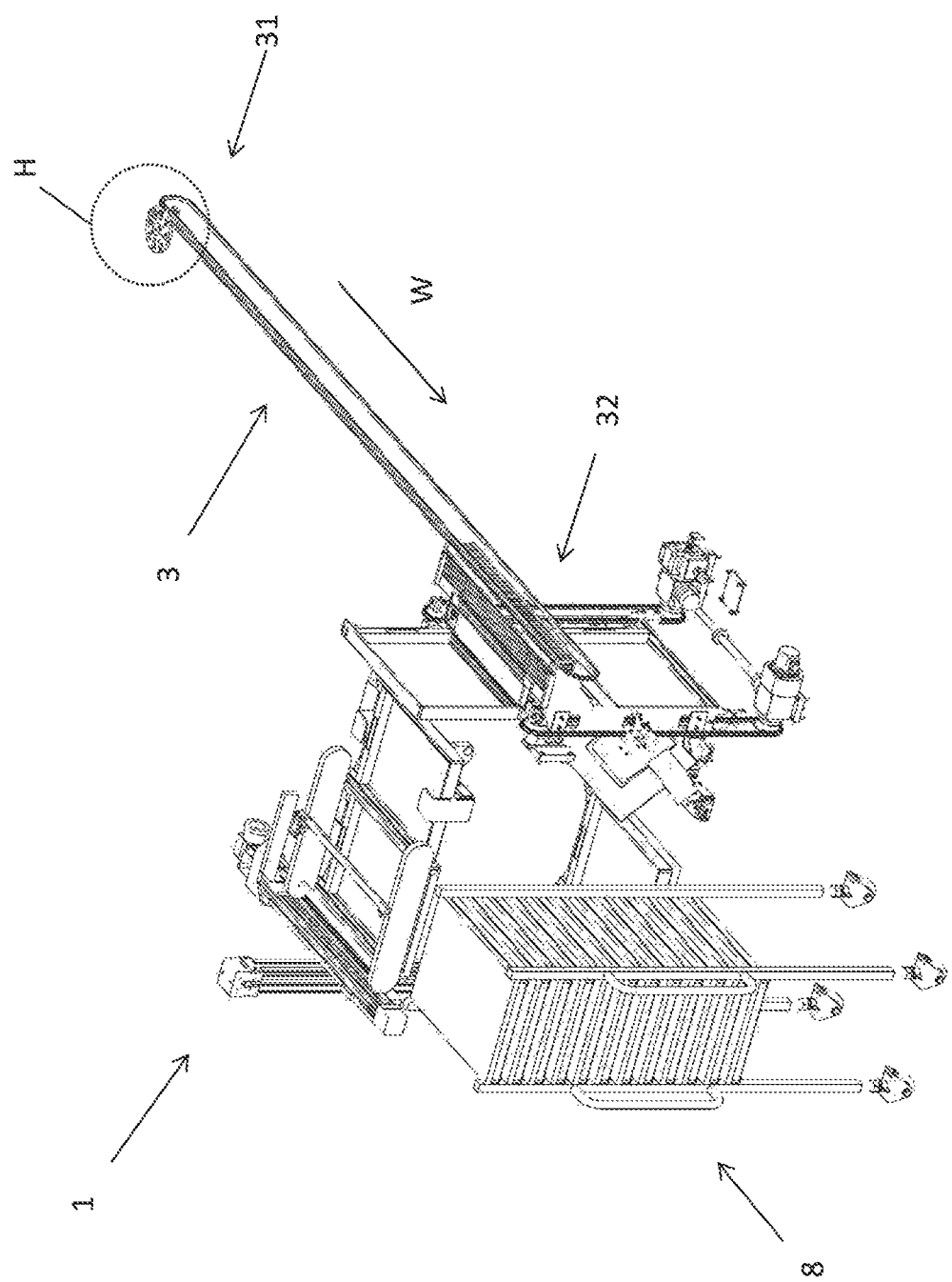
FIG. 1A is a view like that of FIG. 1 but with some parts cut away in order to better illustrate others.

With reference to the accompanying drawings, the reference numeral 1 denotes a system for transferring a group G of components C of electronic cigarettes from a first operating station to a second operating station.

By way of non-limiting example, the components C are cartridges of electronic cigarettes. Alternatively, the components may be components other than the cartridges or they may be complete electronic cigarettes.

Also by way of example, the first operating station (not illustrated) is a cartridge assembly station and the second operating station (also not illustrated) is a cartridge filling station. In another alternative embodiment, the first operating station and the second operating station are both assembly stations where electronic cigarette components are assembled.

Figure 2:
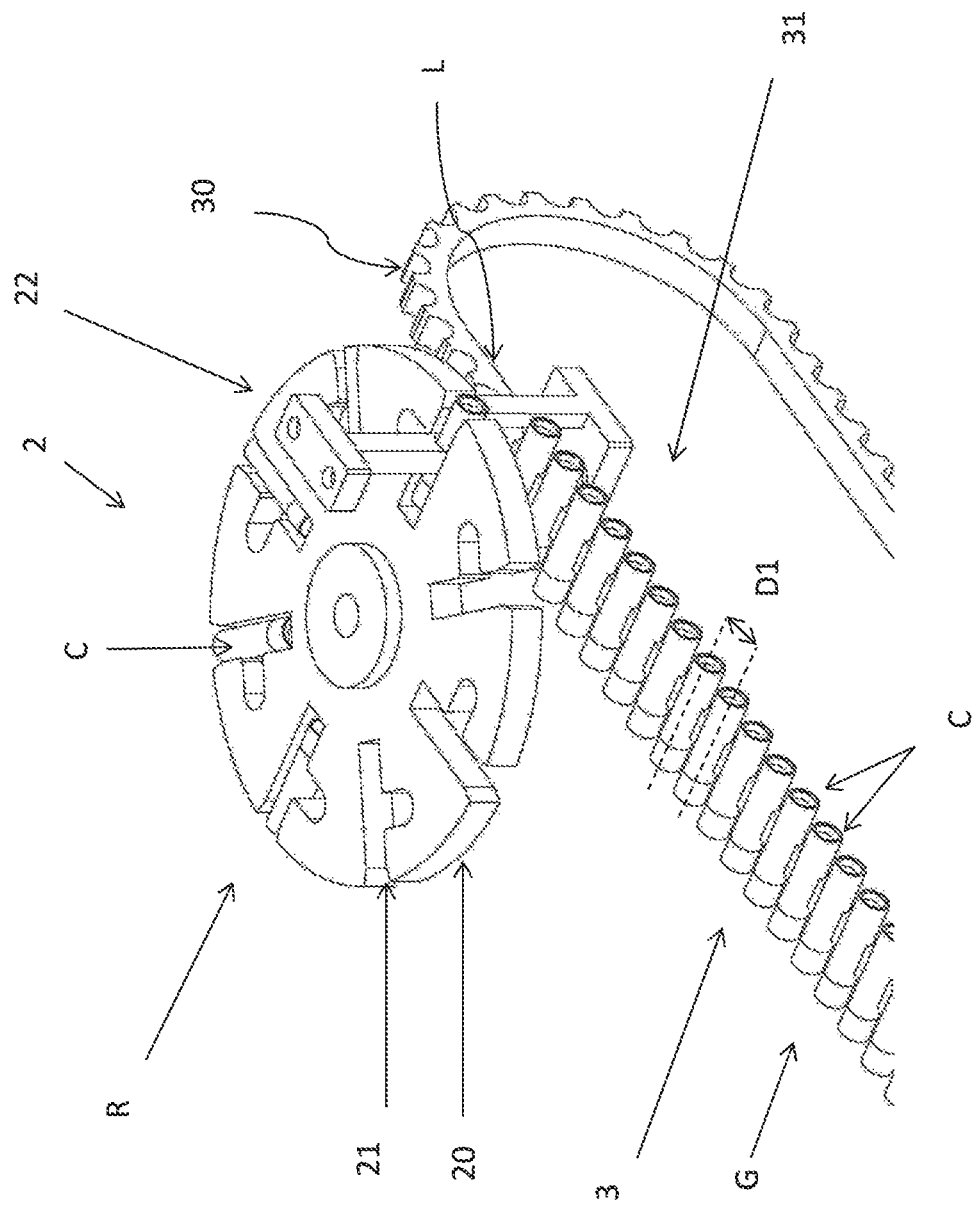
FIG. 2 is an enlarged view of the detail H from FIG. 1.
Figure 3:
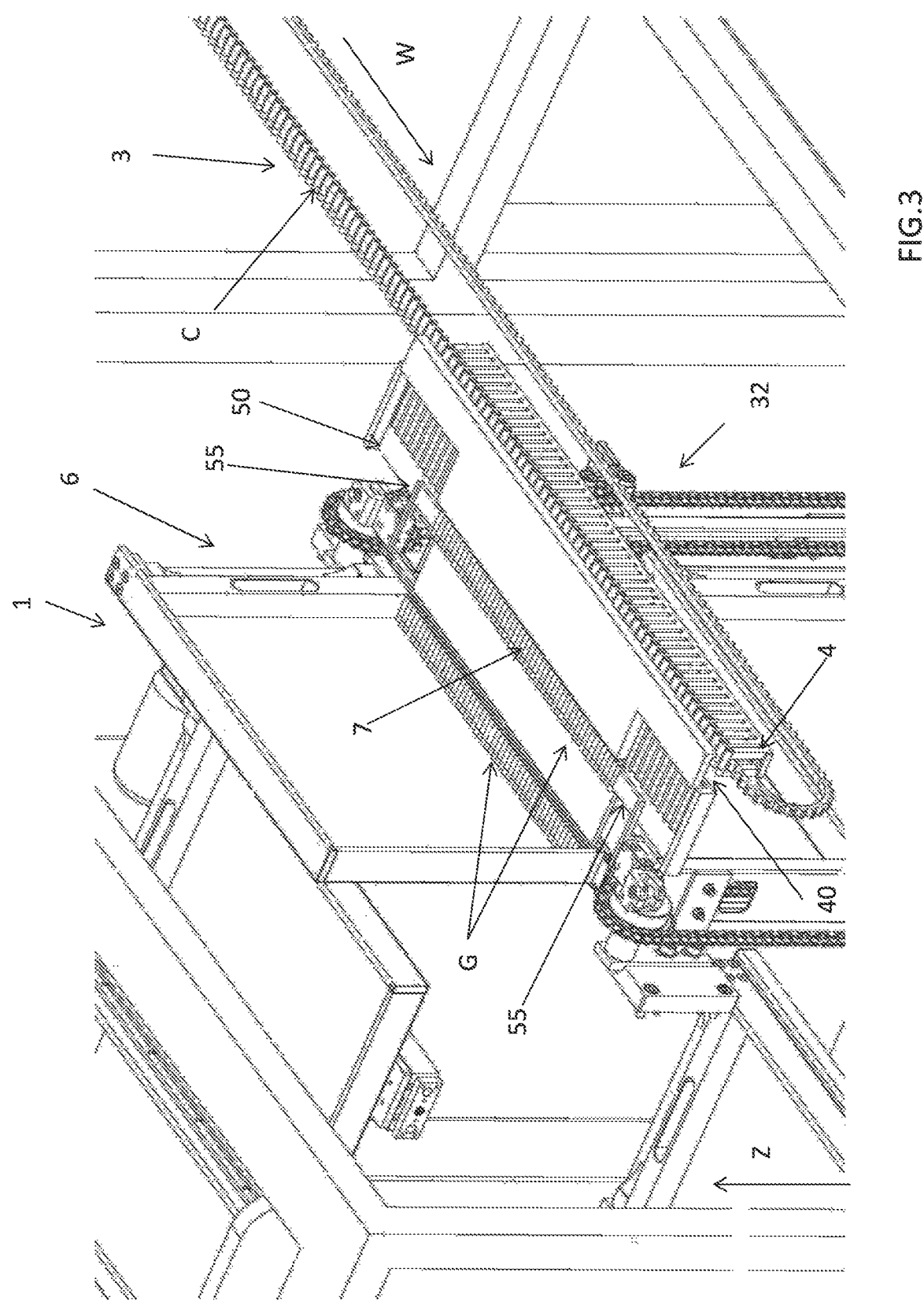
FIG. 3 is an enlarged view of another detail of the system according to the invention, in a first operating situation.
Figure 3A:
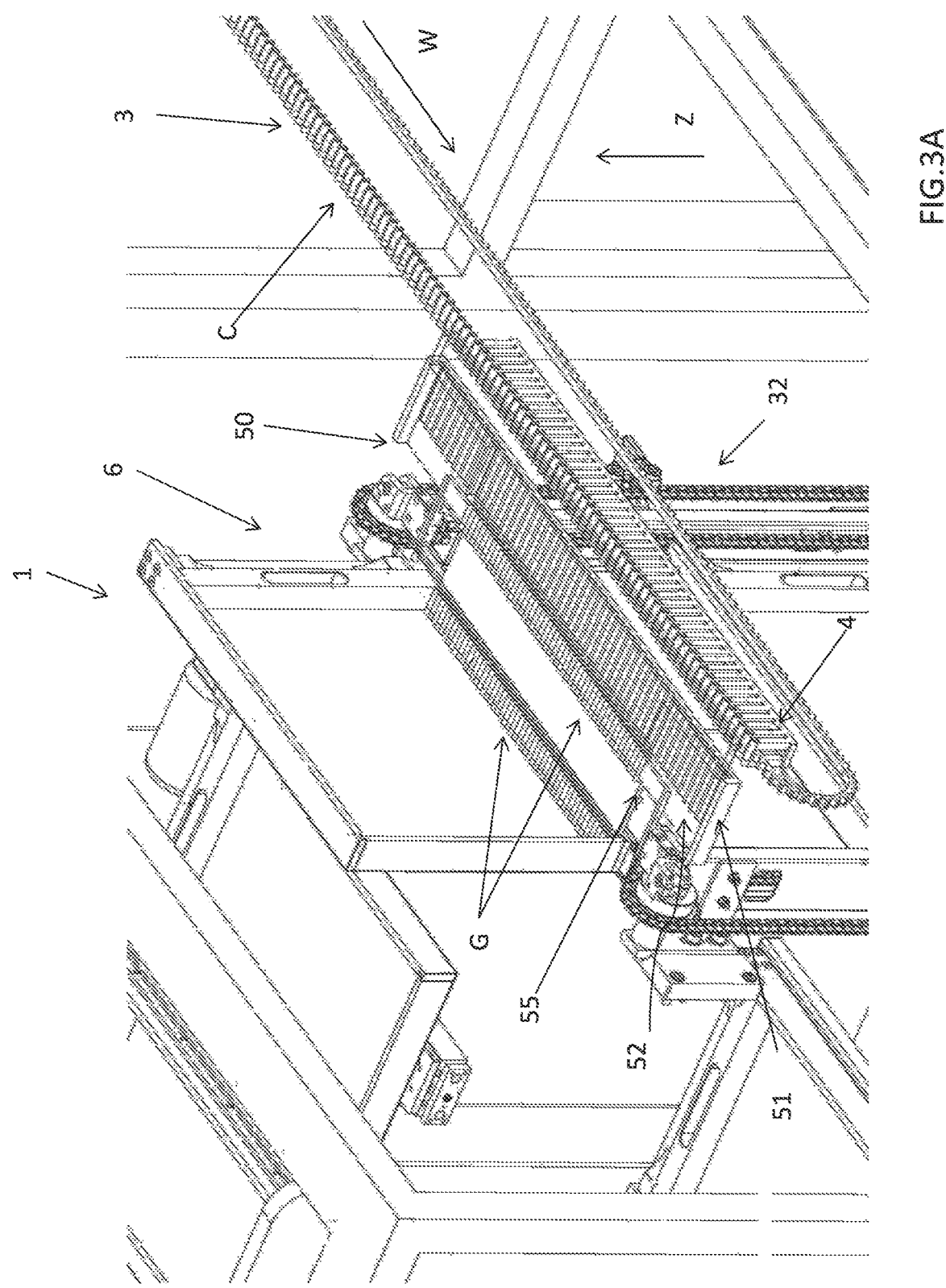
FIG. 3A is a view like that of FIG. 3 but with some parts cut away in order to better illustrate others.

The system 1 according to the invention comprises: a conveyor 3, extending from a feeding zone 31 to a disengagement zone 32 (downstream of the feeding zone 31: see FIG. 1A, for example) and having a plurality of seats 30 arranged in a row and each shaped to receive one of the components C of the group G of components C (see FIG. 2 in particular). In the example illustrated, the number of seats 30 of the conveyor 3 is greater than the number of components C of the group G of components C.

The system 1 also comprises: a feeding device 2 (see FIG. 2) which receives the components C from the first operating station one by one and transfers them into the seats 30 of the conveyor 3 in the feeding zone 31. In detail, the seats 30 of the conveyor 3 are configured and adapted in such a way that the components C in the seats 30 are disposed at a first mutual distance D1 from each other; in other words, two components C in two adjacent seats 30 are at the first mutual distance D1 from each other (once again, see FIG. 2).

The conveyor 3 is operable to convey the group G of components C from the feeding zone 31 to the disengagement zone 32, along a conveying direction W. The conveyor 3 is, for example, a belt provided with seats 30, as in the case illustrated in the drawings.

The system 1 also comprises disengaging and transferring means 4, 40 (shown in FIGS. 3-8A), which operate in the disengagement zone 32 to simultaneously disengage all the components C of the group G of components from their seats 30, moving them along a disengagement direction Z perpendicular to the conveying direction W and to transfer them to a collecting zone 50, while keeping them positioned at the first mutual distance D1 from each other.

The system 1 also comprises compacting means 5 (for example, see FIGS. 3-6A), operating in the collecting zone 50 to move the components C closer together and place them at a second mutual distance D2 that is smaller than the first mutual distance D1. Preferably, when the components C are positioned at the second mutual distance D2, they are in contact with each other, that is to say, the second mutual distance D2 is the minimum distance between one component and another.

Figure 10B:
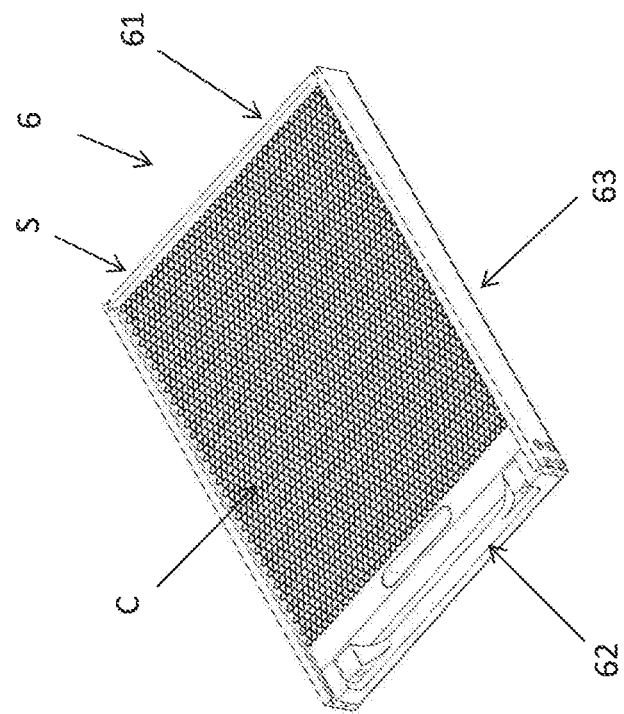
FIGS. 10A-10D are enlarged, perspective views of a detail of the system according to the invention in four different operating situations.
Figure 10A:
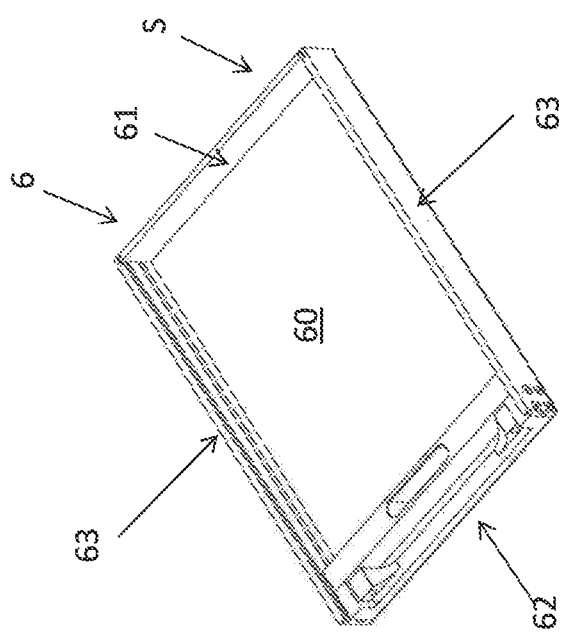
Figure 10D:
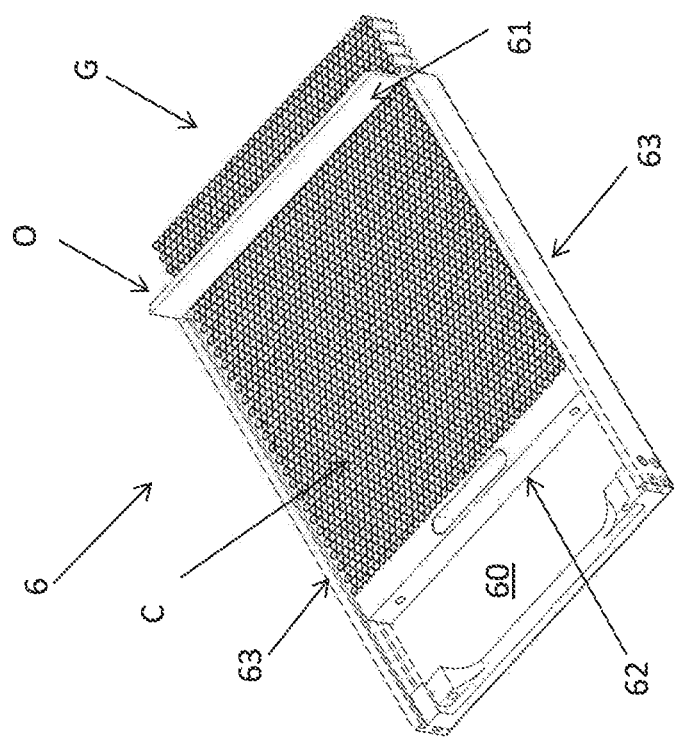
Figure 10C:
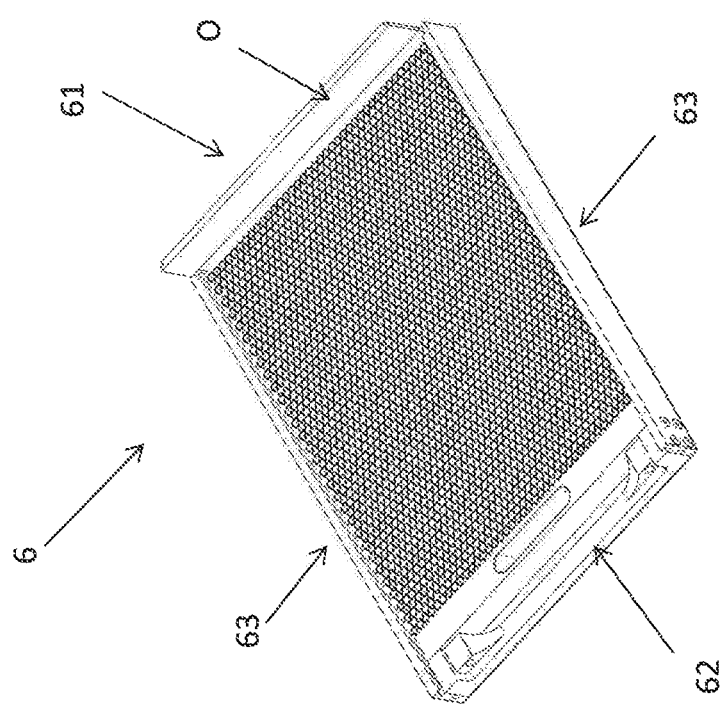

The system 1 also comprises a tray 6 (shown more clearly in FIGS. 10A-10B), facing the collecting zone 50 for receiving from the collecting zone 50 the group G of components C which have been placed close together; and pushing means 7, operating in the collecting zone 50 to push the components C from the collecting zone 50 into the tray 6. With reference to the drawings, when the tray 6 faces the collecting zone 50, it is positioned vertically (see FIGS. 5 and 7, for example).

Figure 9D:
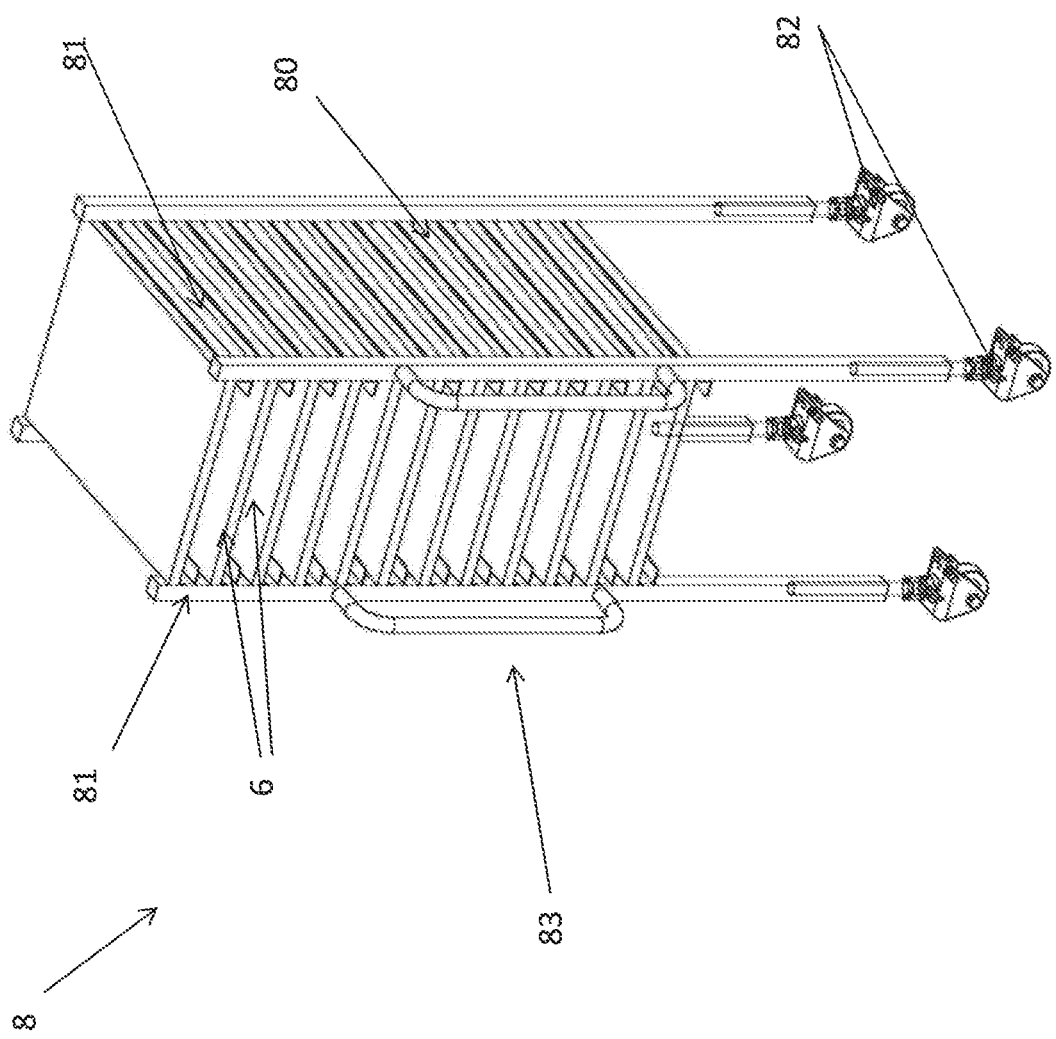
FIG. 9D shows an enlarged, perspective view of a part of the system of FIG. 1.

The system 1 also comprises movement means 8 (see FIG. 9D) for transferring the tray 6 filled with at least one group G of components C to the second operating station (as described in more detail below).

With reference to the preferred embodiment, illustrated in particular in FIG. 2, the feeding device 2 receives the components C, oriented horizontally, from the first operating station and feeds the components C, oriented horizontally, into the seats 30 of the conveyor 3. Unlike prior art solutions, this aspect avoids the need for orienting devices which would complicate the structure of the system 1.

Again with reference to FIG. 2, the feeding device 2 receives the components C with a first orientation from the first operating station and feeds the components C into the seats 30 of the conveyor 3 with a second orientation, turned 180° with respect to the first orientation.

In the preferred embodiment illustrated, the feeding device 2 comprises a rotary element 20 provided with seats 21, each of which is adapted to receive a component C from the first operating station and to hold the component. As stated above and with reference to the drawings, each component C received and held in the seat is oriented horizontally. The rotary element 20 is rotatable about its axis (which, in the accompanying drawings, is a vertical axis) for transferring the components C from a receiving angular position R, where the components C are received in the seats 21, to an angular position L where they are released. The rotary element 20 is, for example, a transfer element of a kind known as starwheel.

With reference to the drawings, the rotary element 20 is mounted above the conveyor 3.

The feeding device 2 further comprises a release device 22, operating on the components C in the seats 21 when the components (C) are at the release angular position L to allow the components C to be released from the seats 21 of the feeding device 2 to the seats 30 of the conveyor 3.

Preferably, the release device 22 is a pusher adapted to disengage the components C from the seats 21, moving them from the top down.

In another embodiment, not illustrated and alternative to the one just described, the feeding device further comprises suction means which are connected to the seats of the rotary element and which can be switched on to hold the components by suction and off when each seat reaches the release angular position to release the components into the seats of the conveyor.

In one embodiment, the disengaging and transferring means 4, 40 comprise a disengaging device 4 located in the disengagement zone 32 and in turn comprising a plurality of seats 41 (see FIGS. 6, 6A and 8, for example) which are spaced from each other by the first mutual distance D1. The disengaging device 4 is movable along the disengagement direction Z, perpendicular to the conveying direction W, from a first position in which its seats 41 do not intercept the components C (they are under or at the same level as the conveyor 3) (see FIG. 4), to a second position in which the seats 41 intercept the components C, allowing the components C to occupy the seats 41 (they are moved above the conveyor 3) (see FIG. 8). Clearly, the disengaging device is shaped so as not to interfere with the conveyor 3, as explained in more detail below).

Figure 4A:
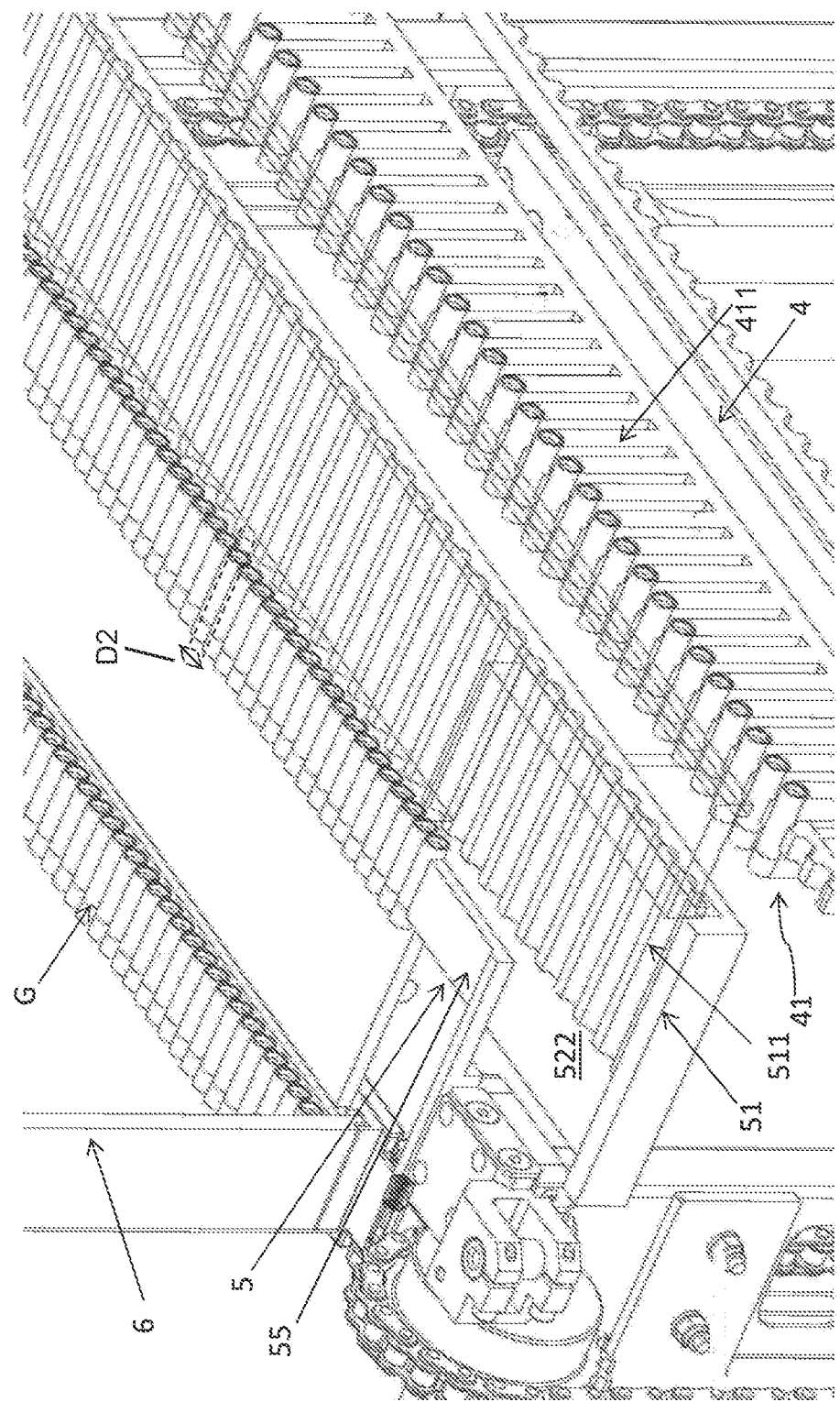
Figure 6:
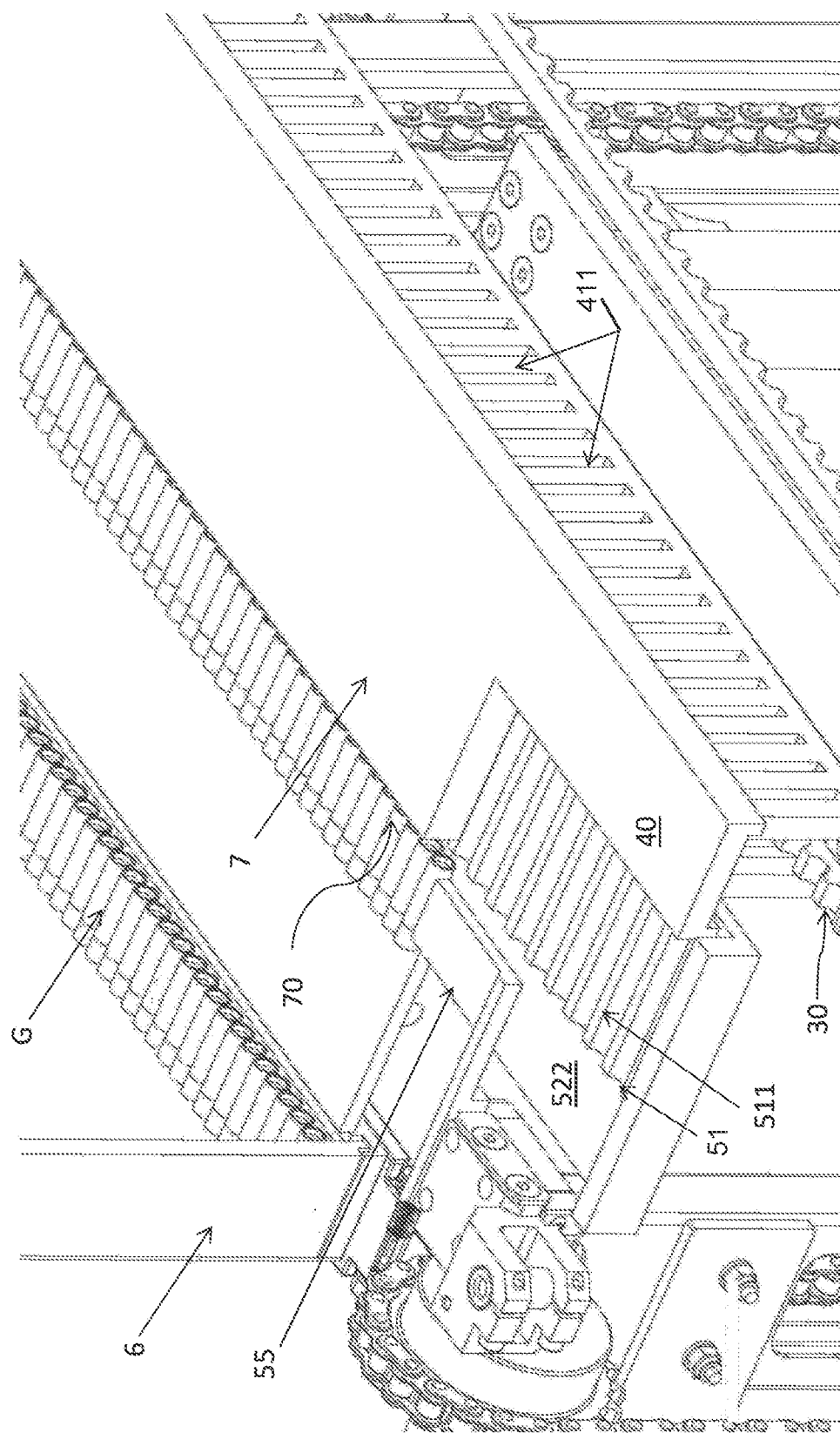
FIG. 6 is an enlarged detail from FIG. 5.
Figure 6A:
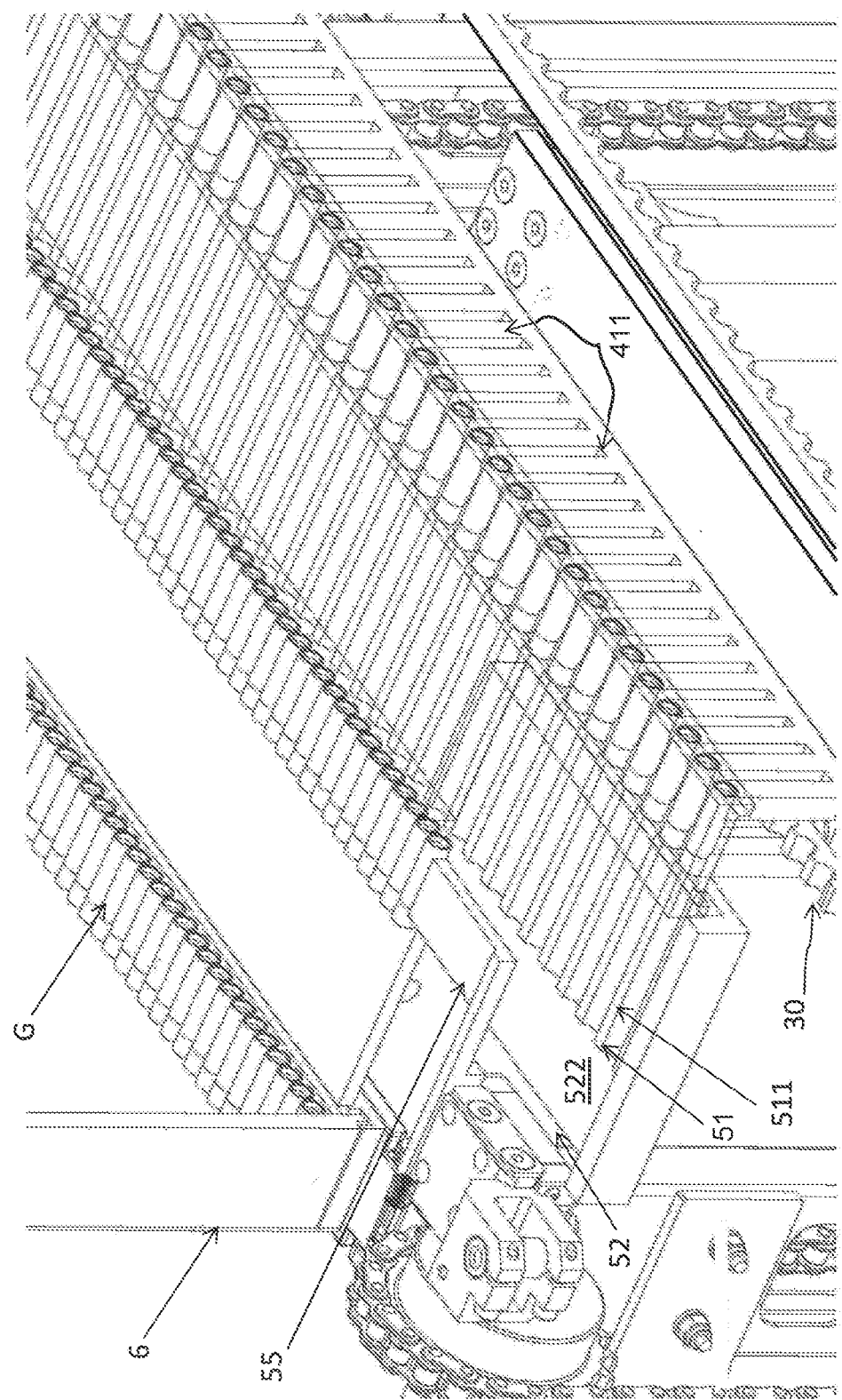
FIG. 6A is a view like that of FIG. 6 but with some parts cut away in order to better illustrate others.
Figure 8:
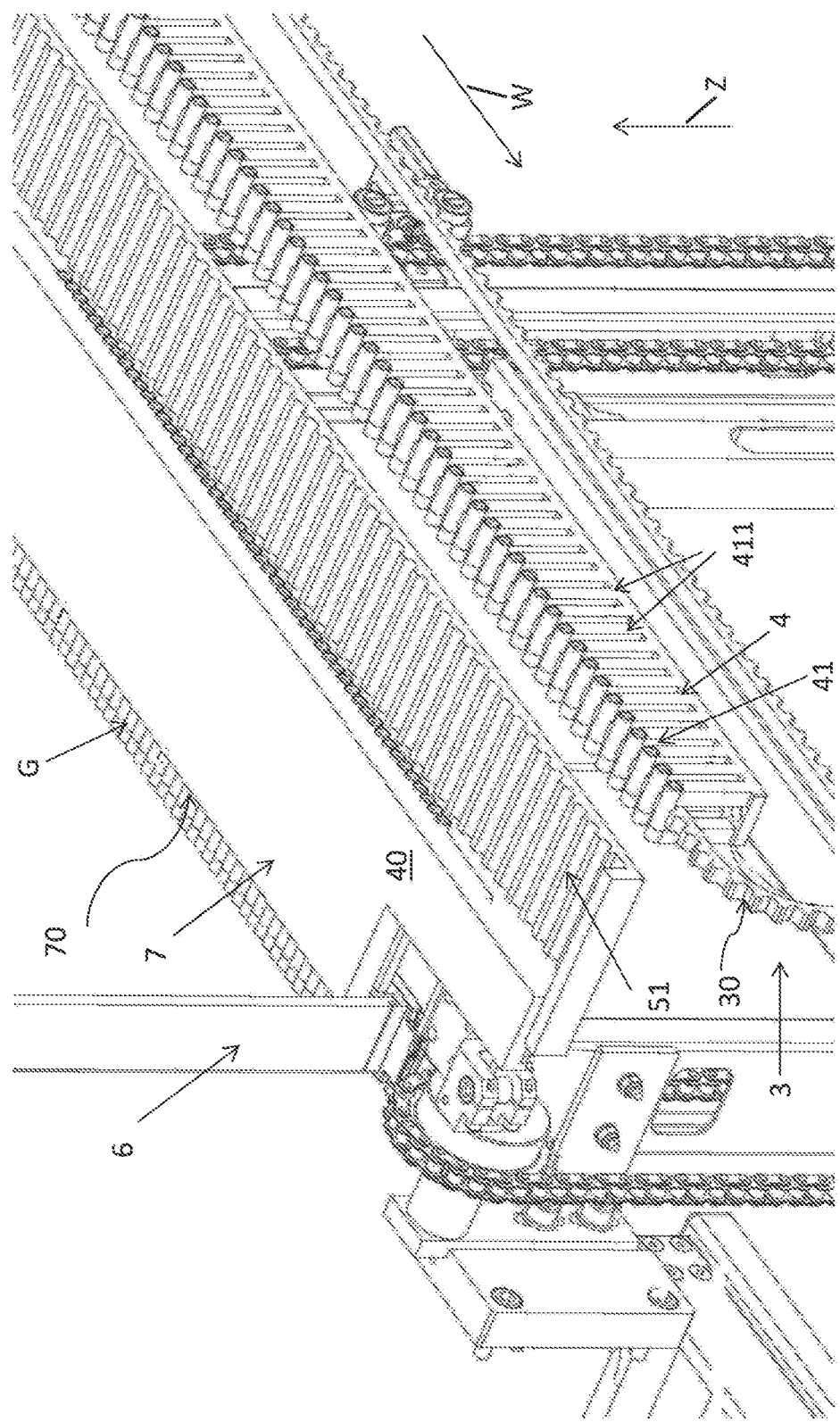
FIG. 8 is an enlarged detail from FIG. 7.

Preferably, the disengaging direction Z is vertical (that is, the disengaging device 41 is moved from the top down, and vice versa), as shown, for example, in FIGS. 4, 4A and 8.

Advantageously, this solution allows quickly disengaging the components C from the conveyor 3 and affords optimum flexibility for the system 1; in effect, the conveyor 3 is driven at significant speeds. The speed of the other operations, downstream of the conveyor 3, may be lower than the speed of the conveyor 3.

With reference to the embodiment illustrated, the disengaging device 4 is comb-shaped and comprises a plurality of prongs 411 which are disposed perpendicularly to the conveying direction W and on which the seats 41 themselves are defined. The prongs 411 are arranged in pairs, one in front of the other, to receive the opposite ends of a component C in a corresponding seat 41 (see FIG. 8A, for example). The prongs 411 are also movable away from each other transversely to the conveying direction W so as not to interfere with the components C being conveyed, before they engage the seats 41 (that is, they have one further degree of freedom) (detail not illustrated).

Preferably, the disengaging and transferring means 4, 40 comprise a transfer device 40 capable of retaining the group G of components C disengaged from the seats 30 of the conveyor 3 and transferring them to the collecting zone 50.

With reference to the drawings, the transfer device 40 comprises an upturned U-shaped element (shown in more detail in FIGS. 4 and 6) for holding the components (C) disengaged from the conveyor 3 by the comb-shaped disengaging device 4. In practice, the transfer device 40 comprises a top wall and two opposite side walls configured (in size and shape) to hold the components C between them. For this purpose, the upturned U-shaped element moves downward to receive the components C which are supported at the bottom by the disengaging device 4.

Preferably, the collecting zone 50 comprises a first part 51 having channels 511 disposed side by side at the first mutual distance D1 (that is, with the same spacing as that of the conveyor 3) to receive the components C, and a second part 52, without channels, where the compacting means 5 operate. The second part 52 is closer to the tray 6 and further from the conveyor 3 than the first part 51; in other words, the second part 52 is interposed between the first part 51 and the tray 6 (see FIGS. 4, 4A, 6,6A, 8, 8A).

More in detail, the second part 52 of the collecting zone 50 comprises a supporting surface 522 (see FIGS. 4, 4A, for example) which supports the components C being held by the upturned U-shaped element after passing through the first part 51, held by the upturned U-shaped element in that case, too.

For example, the compacting means 5 comprise two compacting pushers 55 (for example, see FIG. 4 and FIG. 5) configured to operate bilaterally towards each other with respect to the group G of components C disposed in the second part 52. More in detail, the upturned U-shaped element is adapted to allow the pushing elements 55 to operate under the upturned U-shaped element. In other words, the size of the two side walls 63 of the upturned U-shaped element is such that they only partly touch the components C being held in the transfer device 40 (that is, the size is such as to only partly "cover" the sides of the components C (for example, approximately half the height from the supporting surface 522). That means the upturned U-shaped element has no walls in the "lower" part of it, close to the supporting surface 522, allowing the compacting pushers 55 to operate without interference. That means, therefore, that the compacting pushers 55 operate between the supporting surface 522 and the upturned U-shaped element (see FIGS. 6, 6A and 8, for example).

The compacting pusher elements 55 extend mainly longitudinally and parallel to the components C.

Alternatively, in a variant embodiment not illustrated, the compacting means may consist of a plurality of working units movable independently and each shaped (for example, provided with a dedicated seat) to receive of the components C. The working units are arranged in a row—for example, connected to a linear guide—and are movable relative to each other from a first position, where they receive the components at a first mutual distance, to a second position where they are located at a second mutual distance, smaller than the first mutual distance.

Figure 7:
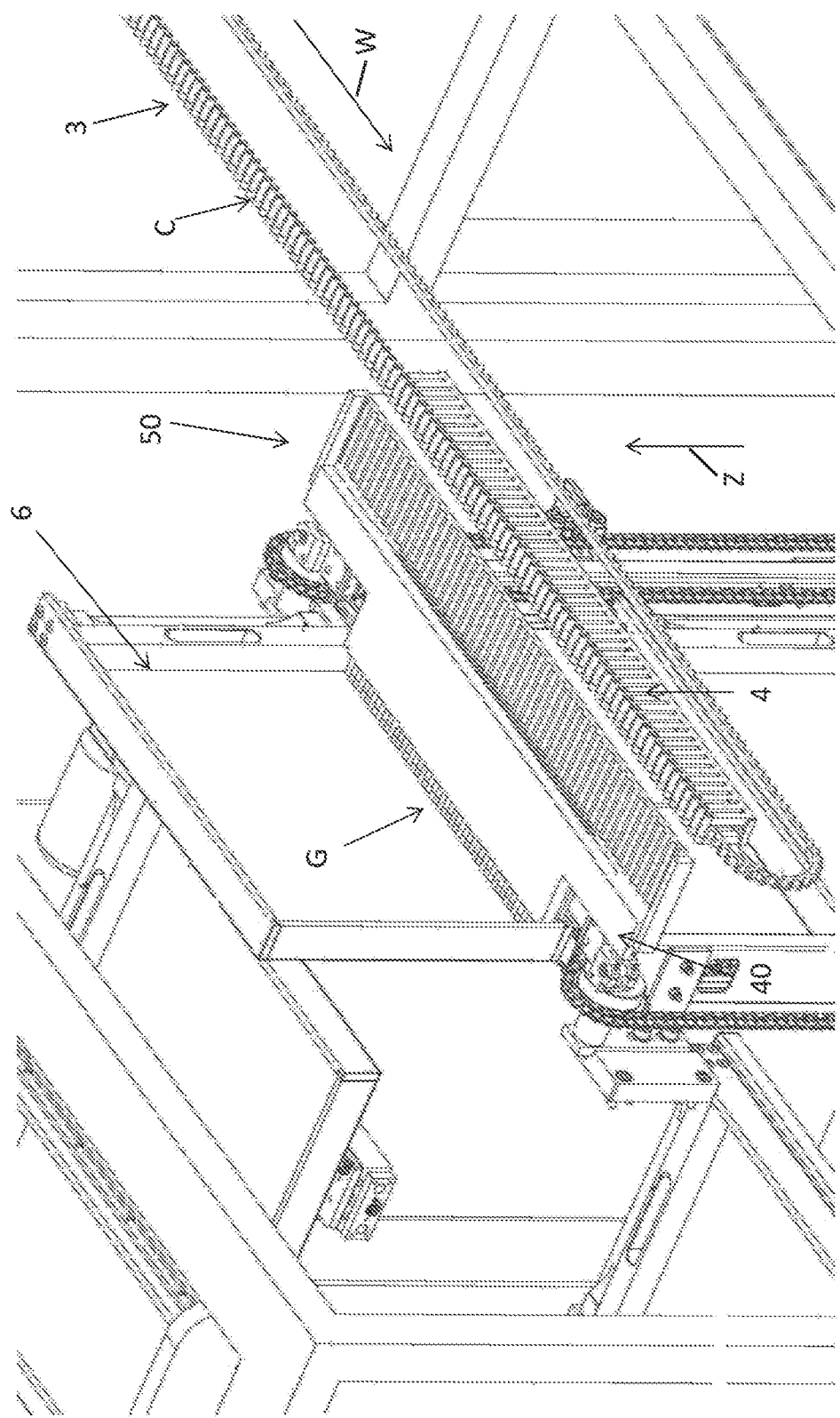
FIG. 7 is a view like that of FIG. 5 but with the system in a second operating situation.

Preferably, the pushing means 7 and the transfer device 40 are made as a single part (see FIG. 5 and FIG. 7, for example). For example, in the embodiment illustrated, the pushing means 7 comprise a pushing surface 70 at right angles to the supporting surface 522 of the second part 52 of the collecting zone 50.

In the case illustrated, where the components C are cylindrical electronic cigarette cartridges, the pushing means 7 push the cartridges into the tray 6 in a direction perpendicular to the rolling direction of the cartridges, that is, parallel to the extension of the cartridges themselves. This aspect allows greater control over the movement of the components C from the collecting zone 50 to the tray 6. Clearly, unlike prior art systems, the system 1 is configured to also transfer components C which are not circular in cross section.

As mentioned above, the tray 6 is positioned vertically when it receives the group G of components C (see FIGS. 1, 1A and 5, for example). Once the tray 6 has been filled with at least one group G of components C, it is turned to a horizontal position and then moved to the second operating station by the movement means 8.

To turn the tray 6 from the horizontal position it is in when it is filled with the components C to the horizontal position, the system 1 comprises a tilting unit 9 (see detail shown in FIGS. 9A-9C, which show three distinct, successive steps of tilting the tray 6).

In the embodiment illustrated, the tilting unit 9 comprises: supporting means 90 (shown in FIG. 9A) for supporting the tray 6 while it is being moved, which support the outside of the tray 6 and which are rotatable about an axis K to enable the tray 6 to be moved; hooking means 900—for example, grippers in the embodiment illustrated—which are connected to the supporting means 90 and which can be hooked onto the tray 6 from both sides in order to steady it while it is being tilted; and a motor M which turns the supporting means 90 between two angular end positions about the axis K: one where the tray 6 is positioned vertically (as in FIG. 7) and the other where the tray 6 is positioned horizontally (as in FIG. 9C).

Once positioned horizontally, the tray 6 can be transported to the second operating station by the movement means 8.

In detail, the movement means 8 (illustrated in FIG. 9D) comprise a supporting structure 80 which is positioned vertically (when in use or ready for use) and a plurality of horizontal supporting elements 81, each of which can receive a tray 6 positioned horizontally. With reference to the drawings, the supporting elements 81 are, for example, longitudinal guides placed opposite each other in pairs (or they may be shelves) fixed to the supporting structure 80 to receive opposite sides of a tray 6.

The supporting elements 81 are aligned vertically along the supporting structure 80 spaced far enough apart to allow a plurality of trays 6 to be placed above one another.

The supporting structure 80 may also comprise a plurality of wheels 82, to facilitate movement, and at least one handgrip 83.

The movement means 8 are substantially embodied in the form of a trolley.

Once a tray 6—preferably a plurality of trays 6—has been placed in the supporting structure 80, an operator can transport it to the second operating station, where the components C are emptied out of the trays 6.

With reference to FIGS. 10A-10D in particular, the tray 6 comprises a bottom 60, a front wall 61, a rear wall 62 opposite to the front wall 61 and two side walls 63 opposite to each other. More specifically, to facilitate emptying the components C out of the tray 6, the front wall 61 is movable between at least one closed configuration S (shown in FIGS. 10A and 10B), where the components C are prevented from coming out, and an open configuration O (shown in FIGS. 10C and 10D), where the components C are allowed to come out. The front wall 61 is, for example, connected to the side walls 63 by a bayonet coupling.

Further, the rear wall 62 is movable (at least partly) towards the front wall 61 in such a way as to push the components C out of the tray 6 when the front wall 61 is in the open configuration O.

Preferably, the front wall 61 is slidable between the two side walls 63 away from the bottom 60 and the rear wall 62 is slidable (at least partly) between the two side walls 63 towards the front wall 61.

The bottom 60 is preferably very reduced in thickness so as to limit the height of the "jump"—that is, the difference in height—which the components must take as they move out of the tray 6 onto the supporting surface or onto the conveyor belt.

Described below for greater clarity is the operation of the system 1 in its entirety, with reference to the preferred embodiment illustrated in the accompanying drawings.

A first group G of components C (cartridges) is transferred from the first operating station (for example, an automatic assembly station, not illustrated) into the seats 21 of the feeding device 2 which, as described above, feeds the individual components C into the seats 30 of the conveyor 3 in the feeding zone 31 (where the components C are at the first mutual distance D1 from each other).

While the components C of the first group G of components C are being transferred into its seats 30, the conveyor 3 moves stepwise along the conveying direction W to carry the first group G of components C towards the disengagement zone 32. Clearly, the group G of components C corresponds to a "row" received successively in the tray 6.

Once the first group G is in the disengagement zone 32, the disengaging device 4—that is, the comb-shaped element 4—is activated and, by moving from the top down, receives the components C, spaced apart by the first mutual distance D1, in the respective seats 41, on the prongs 411. Once the components C are disengaged, the transfer device 40 which, in the drawings, is the upturned U-shaped element, receives the components C of the first group G from the comb-shaped element 4 and transfers them to the collecting zone 50, first in the first part 51, that is, in the channels 511, and then in the second part 52, that is, on the supporting surface 522. Here, the components C are moved closer together by the compacting pushing elements 55 until reaching the second mutual distance D2. The comb-shaped device 4 can move from the top down until it is once again under the conveyor 3.

In the meantime, a second group G of components C is fed to the conveyor 3 and reaches the disengagement zone 32 and is transferred into the first part 51 of the collecting zone 50. During the next step that is, transfer of the second group G of components from the first part 51 to the second part 52 of the collecting zone 50 the upturned U-shaped element performs a movement parallel to the supporting surface 522 and the pushing means 7, with their pushing surface 70, simultaneously push the components C of the first group G which was in the second part 52 of the collecting zone 50, into the tray 6. Next, the upturned U-shaped element (with the pushing means 7 connected thereto) is moved from the bottom up and then down again to allow the upturned U-shaped element to receive a third group G of components C. In other words, in this preferred embodiment, the upturned U-shaped element and the pushing elements 7 follow, as a single part, a trajectory whose profile defines a quadrilateral with at least two vertical sides and at least two horizontal sides.

The tray 6 moves stepwise vertically, from the top down, each time it receives a group G (that is, a "row") of components C, until it is full (or contains a predetermined number of components C). It is then turned to the horizontal position by the tilting device 9 and placed in the supporting structure 80 (that is, in the movement means 8). More specifically, each time a tray 6 is placed in the supporting structure 80, it occupies the free position nearest the floor. When the supporting structure 80 is full or contains a predetermined number of trays 6, it is taken by an operator to the second operating station.

Next, each tray 6 is removed from the supporting structure and placed on a flat surface, preferably on a conveyor belt (not illustrated) feeding into the second operating station. Here, the operator unloads the components C, by first moving the front wall 61 to the open configuration O and then gripping the rear wall 62, which is pushed towards the front wall 61 to feed the components C out of the tray 6, as described above.

The invention claimed is:

1. A system for transferring a group of components of electronic cigarettes from a first operating station to a second operating station, the system comprising:
   a conveyor, extending from a feeding zone to a disengagement zone and having a plurality of conveyor seats arranged in a row and each shaped to receive one of the components;
   a feeding device including at least one feeding seat and configured to receive the components from the first operating station one by one and feed the components into the conveyor seats in the feeding zone; the components in the conveyor seats being positioned at a first mutual distance from each other; the conveyor being operable to convey the group of components from the feeding zone to the disengagement zone, along a conveying direction;
   a disengaging and transferring device including a disengagement surface, configured to operate in the disengagement zone to simultaneously disengage all the components of the group from their conveyor seats and to move the group of components along a disengagement direction perpendicular to the conveying direction; and to transfer the group of components to a collecting zone, while keeping the group of components positioned at the first mutual distance from each other;
   a compacting device including at least one compacting surface, configured to operate in the collecting zone to engage and move the components of the group of components closer together and position the components of the group of components at a second mutual distance from each other that is smaller than the first mutual distance;
   a tray facing the collecting zone for receiving from the collecting zone the group of components which have been placed closer together;
   a pushing device including a pushing surface, configured to operate in the collecting zone to engage and push the group of components from the collecting zone into the tray;
   a movement device for transferring the tray containing the group of components to the second operating station.

2. The system according to claim 1, wherein the feeding device is configured to receive the components, oriented horizontally, from the first operating station and feed the components, oriented horizontally, into the conveyor seats.

3. The system according to claim 1, wherein the feeding device is configured to receive the components with a first orientation from the first operating station and feed the components into the conveyor seats with a second orientation, turned 180° with respect to the first orientation.

4. The system according to claim 1, wherein the feeding device comprises:
   a rotary element having a plurality of the at least one feeding seat, the plurality of feeding seats each being shaped to receive and hold a component received from the first operating station; the rotary element being rotatable about an axis for transferring the components in the feeding seats from a receiving angular position, where the components are received in the feeding seats, to a release angular position;
   and a release device, operating on the components in the feeding seats when the components are at the release angular position to allow the components to be released from the feeding seats of the feeding device to the conveyor seats.

5. The system according to claim 1, wherein the disengaging and transferring device comprises a disengaging device located in the disengagement zone, which includes a plurality of transfer seats: the disengaging device being movable along the disengagement direction from a first position in which the transfer seats do not intercept the components, to a second position in which the transfer seats intercept the components, allowing the components to occupy the transfer seats.

6. The system according to claim 5, wherein the disengaging device is comb-shaped and comprises a plurality of prongs which are disposed perpendicularly to the conveying direction and on which the transfer seats are defined.

7. The system according to claim 1, wherein the disengaging and transferring device comprises a transfer device capable of retaining the group of components disengaged from the conveyor seats and transferring the group of components to the collecting zone.

8. The system according to claim 7, wherein the pushing device and the transfer device are made as a single part.

9. The system according to claim 7, wherein the transfer device comprises an upturned U-shaped element for holding the components disengaged from the conveyor by the comb-shaped disengaging device and transferring the group of components in the collecting zone.

10. The system according to claim 9, wherein the second part of the collecting zone comprises a supporting surface which supports the components being held from above by the upturned U-shaped element; and wherein the compacting device includes two pushing elements each with one of the at least one compacting surface and adapted to operate bilaterally with respect to the group of components being moved closer together; and wherein the upturned U-shaped element is adapted to allow the pushing elements to operate between the supporting surface and the upturned U-shaped element.

11. The system according to claim 1, wherein the collecting zone comprises a first part having channels disposed at the first mutual distance and a second part, without channels, where the compacting device operates.

12. The system according to claim 1,
wherein the tray comprises a bottom, a front wall, a rear wall opposite to the front wall and two side walls opposite to each other;
wherein the front wall is movable between at least one closed configuration, where the components are prevented from coming out, and an open configuration, where the components are allowed to come out;
and wherein the rear wall is movable towards the front wall in such a way as to push the components out of the tray when the front wall is in the open configuration.

\* \* \* \* \*